(12) United States Patent
Düperthal et al.

(10) Patent No.: US 11,976,761 B2
(45) Date of Patent: May 7, 2024

(54) FITTING WITH LOCKING RING FOR NON-DETACHABLE CONNECTION TO AT LEAST ONE PIPE

(71) Applicant: Viega Technology GmbH & Co. KG, Attendorn (DE)

(72) Inventors: Fabian Düperthal, Lennestadt (DE); Stefan Rocksloh, Attendorn (DE); Andreas Schneider, Finnentrop—Schoenholthausen (DE); Detlev Schmitt, Drolshagen (DE); Sudi Sinoplu, Attendorn (DE); Andreas Hütte, Attendorn (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 297 days.

(21) Appl. No.: 17/440,367

(22) PCT Filed: Mar. 10, 2020

(86) PCT No.: PCT/EP2020/056329
§ 371 (c)(1),
(2) Date: Sep. 17, 2021

(87) PCT Pub. No.: WO2020/187645
PCT Pub. Date: Sep. 24, 2020

(65) Prior Publication Data
US 2022/0186869 A1 Jun. 16, 2022

(30) Foreign Application Priority Data

Mar. 20, 2019 (DE) ..................... 10 2019 107 130.5

(51) Int. Cl.
*F16L 37/10* (2006.01)

(52) U.S. Cl.
CPC ......... *F16L 37/101* (2013.01); *F16L 2201/10* (2013.01)

(58) Field of Classification Search
CPC ... F16L 37/101; F16L 2201/10; F16L 37/138; F16L 37/133
See application file for complete search history.

(56) References Cited

U.S. PATENT DOCUMENTS 695,551 A * 3/1902 Hatch .................. F16L 37/133
  285/374
2,434,219 A * 1/1948 Morrison .............. F16L 37/133
  285/423

(Continued)

FOREIGN PATENT DOCUMENTS

CN 108953807 A 12/2018
DE 102004032941 A1 4/2005

(Continued)

*Primary Examiner* — Zachary T Dragicevich
*Assistant Examiner* — James A Linford
(74) *Attorney, Agent, or Firm* — The Webb Law Firm

(57) ABSTRACT

A fitting for permanently connecting to at least one tube, the fitting including: a main body; a retaining element which has locking elements for locking to a corresponding locking element of the tube to be connected; a sealing element; and a blocking ring, the blocking ring allowing movement of the retaining element in the radial direction in a first axial position and preventing movement of the retaining element outwards in the radial direction in a second axial position.

8 Claims, 10 Drawing Sheets

(56) References Cited

U.S. PATENT DOCUMENTS

| | | | | |
|---|---|---|---|---|
| 2,675,829 | A | * | 4/1954 | Livers .................... F16L 37/36 |
| | | | | 285/322 |
| 2,784,987 | A | * | 3/1957 | Corcoran .............. F16B 7/0413 |
| | | | | 285/82 |
| 3,918,485 | A | * | 11/1975 | Weber ................... E21B 43/013 |
| | | | | 137/614.04 |
| 4,995,643 | A | * | 2/1991 | Rappart ................ F16L 37/133 |
| | | | | 285/86 |
| 5,029,904 | A | | 7/1991 | Hunt |
| 7,318,609 | B2 | | 1/2008 | Naito et al. |
| 10,823,123 | B2 | | 11/2020 | Lee et al. |
| 2004/0100097 | A1 | * | 5/2004 | Fukano ................ F16L 47/041 |
| | | | | 285/322 |
| 2008/0036206 | A1 | * | 2/2008 | Li-Guo ................ E03C 1/0403 |
| | | | | 285/322 |
| 2018/0119859 | A1 | | 5/2018 | Lee et al. |
| 2021/0332921 | A1 | | 10/2021 | Yu et al. |

FOREIGN PATENT DOCUMENTS

| | | |
|---|---|---|
| DE | 102015118546 A1 | 5/2017 |
| DE | 102017217176 A1 | 5/2018 |
| JP | 4264937 B2 | 5/2009 |
| KR | 20180047945 A | 5/2018 |

\* cited by examiner

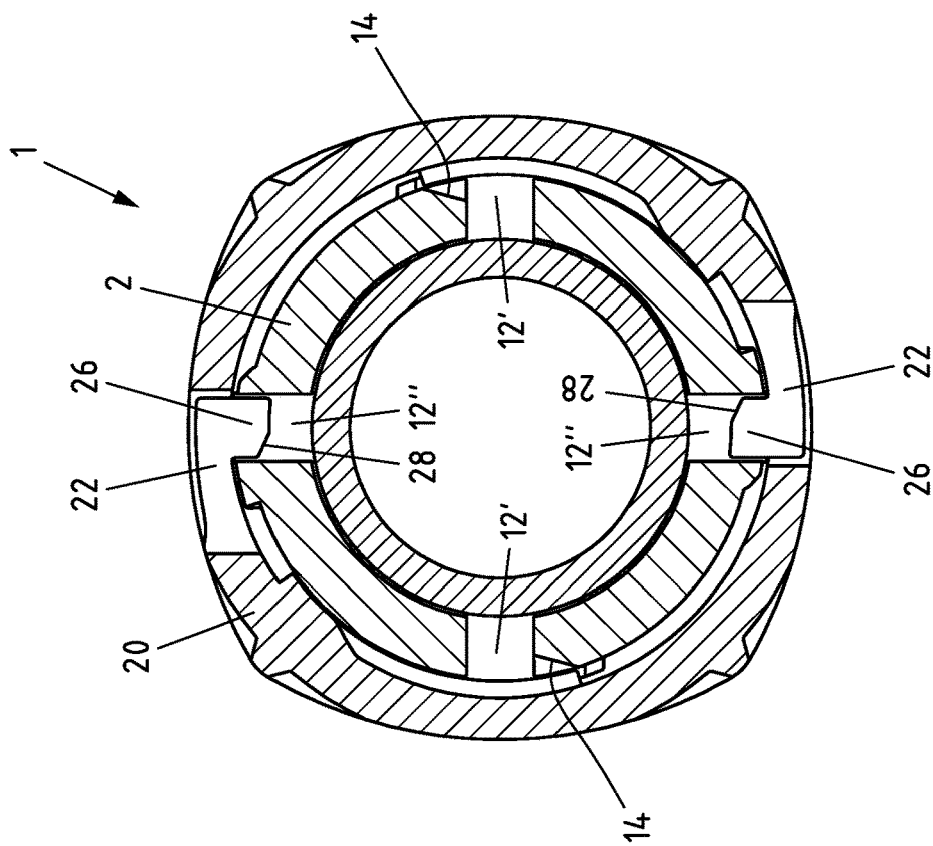
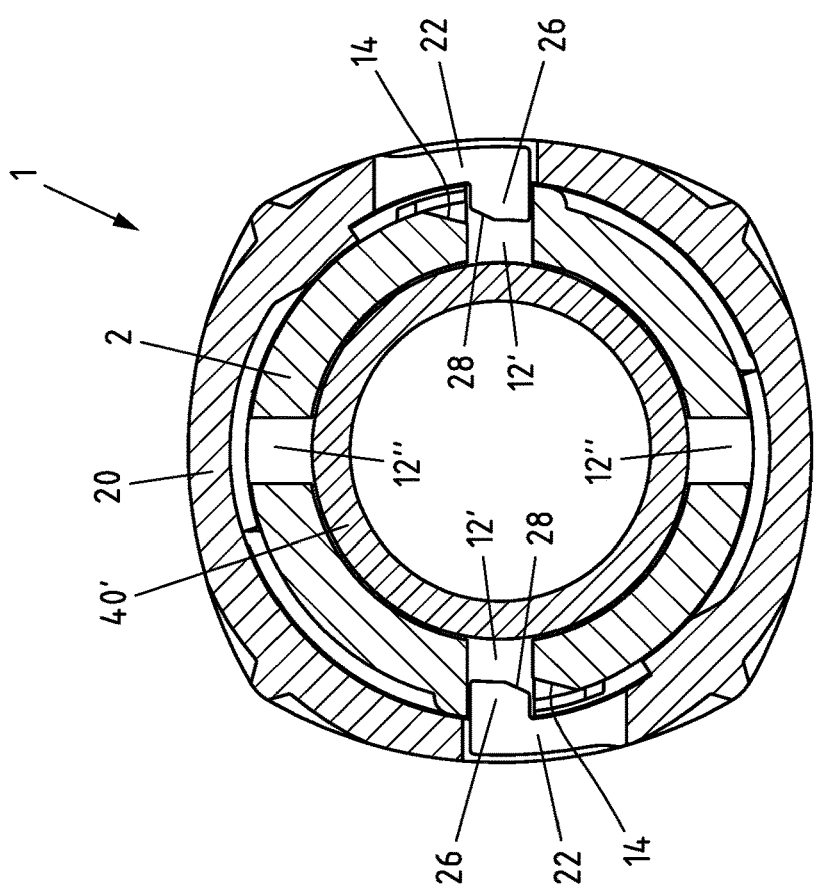
Fig.7b
Fig.7a

FITTING WITH LOCKING RING FOR NON-DETACHABLE CONNECTION TO AT LEAST ONE PIPE

CROSS-REFERENCE TO RELATED APPLICATIONS

This application is the United States national phase of International Application No. PCT/EP2020/056329 filed Mar. 10, 2020, and claims priority to German Patent Application No. 10 2019 107 130.5 filed Mar. 20, 2019, the disclosures of which are hereby incorporated by reference in their entirety.

BACKGROUND OF THE INVENTION

Field of the Invention

The invention relates to a fitting for non-detachable connection to at least one pipe with a base body, with a retaining element, the retaining element having latching element for latching with a corresponding latching element of the pipe to be connected, and with a sealing element.

Description of Related Art

The technical field relevant to the present invention is the on-site installation of piping systems, in which a piping system consisting of pipe sections and fittings is generally installed for conducting and guiding a fluid. A fitting is basically a connector of a pipeline and is most commonly used to connect two or more pipe sections. The most common fittings include straight joints, changes of direction in the form of pipe bends, reducers, and branches such as tees or crossings. However, a fitting is also understood to be a pipe connection of a fitting or other component. For example, thermometers or pressure gauges as fittings have only one connection for a pipe section.

The piping systems described above are used in particular to transport drinking or heating water, gas for operating a heating system or industrial gases.

Commonly used pipe materials in drinking water and sprinkler applications are hard plastics such as Atactic Polypropylene (PP-R) and Chlorinated Polyvinyl Chloride (CPVC). Cross-linked polyethylene (PEX) is also used for this purpose. In addition, the invention also relates to the joining of metal pipes.

In the case of plastic pipes, the pipes or fittings are joined by welding in the case of PP-R, for example, or by adhesive bonding in the case of CPVC. The main disadvantage here is the very time-consuming processing. Both PP-R welded connectors and CPVC adhesive fittings require intensive preparation of the joint. Another disadvantage is the long cooling (PP-R) or airing (CPVC) times until the system can be exposed to water or another fluid. In addition, expensive welding machines are required for PP-R processing and both welding and bonding processes are subject to uncertainties in later operation.

In addition to the described adhesive and welded connectors, plug-in connectors are also known from the prior art, where no pre-installation and alignment of the system before pressing is possible. In addition, the described fittings are already tight after insertion of the pipe. Furthermore, half-shell fittings for grooved CPVC pipes are known, but this type of fitting requires an expensive tool for inserting grooves and has a multi-part design. For a connection, hinged half-shells are placed around the pipe and connected to each other by means of a clamping interlock.

From CN 108953807 A, a connector for hoses with a base body and a screw cap serving as a locking ring and having locking means is known.

From DE 10 2015 118 546 A1, a fastening device for corrugated tubes is known with a base body and a fastening element with latching hook, wherein the fastening element can be moved by rotation into a locking state and back again into an unlocking state.

From DE 10 2017 217 176 A1, a quick connector for tubes with a main body and a sliding guide is known, wherein by sliding the sliding guide over the main body and by means of locking means a tube can be locked in the quick connector and released again by pushing back the sliding guide.

SUMMARY OF THE INVENTION

Therefore, the present invention is based on the technical problem of providing a fitting suitable for the non-detachable connection of pipes, with which the disadvantages shown can be at least partially eliminated.

According to the invention, the aforementioned technical problem is solved by a fitting mentioned at the beginning for non-detachable connection to at least one pipe in that the fitting has a locking ring, that the locking ring in a first axial position allows a movement of the retaining element in radial direction and in that the locking ring in a second axial position prevents a movement of the retaining element in the outwards radial direction.

By means of the fitting according to the invention, it is possible to make a reliable pipe connection in a short time without additional special tools. In addition, the installation of piping systems is greatly simplified, so that even untrained personnel or persons from outside the field can make pipe connections.

Due to the latching element of the retaining element, which can be part of the basic body, the pipe to be connected preferably latches positively when inserted into the fitting and can no longer be detached. In this way, no additional claw elements are required. The corresponding locking element of the pipe is, for example, one or more grooves which are made in the outer circumference of the pipe. The latching element of the retaining element engage in the groove(s) or otherwise designed features of the tube. The interaction of the tube feature with the latching element of the retaining element provides a simple and reliable insertion depth check, which can be additionally confirmed, for example, by an acoustic indicator ("clicking in").

The engagement of the locking means in each other already creates a non-detachable connection between the fitting and the pipe, as the fitting can only be detached by damaging or destroying the locking elements. An undetachable connection therefore means a connection that can only be undone by destroying part of the fitting. Nevertheless, it has been recognized that destructive breaking of the connection can be largely prevented in the event of excessive forces acting on it by providing a locking ring.

The sealing element of the fitting achieves a sealing effect by, for example, the outer side of the preferably chamfered, inserted pipe resting against the sealing element and the sealing element being plastically deformed. By chamfering the pipe, damage to the sealing element can be prevented when the pipe is inserted. The sealing element can be an O-ring, a rubber lip or another sealing agent known to the skilled person. A circumferential groove can be provided in the body of the fitting for the sealant.

When the tube is inserted, the locking ring is in the first axial position so that movement of the retaining element in the radial direction is permitted. In this way, the latching elements of the retaining element can be pushed radially outwards when the pipe is inserted, so that the insertion of the pipe is made possible. After the pipe has been pushed into the fitting to such an extent that the corresponding latching element of the pipe latches with the latching element of the retaining element, whereby the latching element of the retaining element perform a movement in a radially inward direction, the locking ring is displaced from the first axial position to the second axial position. The locking ring in the second axial position prevents a renewed radially outward movement of the latching elements of the retaining element. The locking ring thus prevents the latching elements of the retaining element, which are locked with the corresponding locking element of the pipe, from disengaging due to, for example, movements of the piping system, high internal pipe pressure or other influences. In particular, the locking ring makes it possible to increase the bursting pressure of the pipe connection.

The base body, the retaining elements, and the locking ring of the fitting are preferably made of plastic, but other materials such as metals or combinations of materials are also possible for individual or all parts of the fitting.

In a preferred embodiment, the axial displacement of the locking ring from the first axial position to the second axial position is effected by twisting the locking ring along the thread, wherein the twisting is effected through an angle of less than 360°, in particular less than 180°, preferably less than 90°.

This allows the locking ring to be moved easily and effectively from the first axial position to the second axial position. The twisting is preferably possible manually. The locking ring can furthermore have an outer shape provided with a contour for the attachment of a tool, in particular with a hexagonal or octagonal contour. Thus, a manual actuation of the fitting can be carried out with usual tools if an actuation with the hands alone should not be possible.

The rotation of the locking ring from the first axial position into the second axial position, whereby the rotation takes place through an angle of less than 360°, in particular less than 180°, preferably less than 90°, avoids an unnecessarily frequent re-gripping during manual rotation or an unnecessarily frequent repositioning of the tool during rotation by means of a tool. This property is achieved by a corresponding pitch of the thread.

In a further embodiment, the retaining element and the base body are integral, i.e. formed in one piece.

This enables a time-and-cost-efficient production of the components, which are usually manufactured by means of an injection moulding process. In addition, an integral design eliminates the need for pre-assembly of the retaining element and base body. Furthermore, an integral design can mean a higher strength of the components, as a connection point always harbors a possible weak point.

However, a non-integral design is also conceivable, in which the base body is screwed, glued, hooked or otherwise connected to the retaining element, for example. In this case, the base body and the retaining element can be assembled at the factory or shortly before the fitting is installed.

In a further embodiment, the axial displacement of the locking ring from the first axial position to the second axial position is irreversible.

This prevents the pipe connection from being opened again. Experience has shown that repeated closing and opening of pipe connections in the construction site environment impairs the quality of the pipe connection. Furthermore, it makes unauthorized tampering with a pipe system once it has been closed more difficult.

Irreversibility is achieved according to the invention by a locking means ("twist & lock") which acts between the locking ring and the base body in the second axial position of the locking ring and is non-releasable. In this way, a renewed displacement of the locking ring from the second axial position to the first axial position is prevented. This locking can also generate an acoustic signal as an indicator during locking which signals a locking of the locking ring and the retaining element in the second axial position. The previously described locking leads to an increase in the undetachability of the connection as the locking ring according to the invention can only be turned back by partially destroying the locking elements.

In addition, colored markings can be provided to indicate the status of the displacement of the locking ring. For example, in the second axial position of the lantern piece, a green area of the body can be visible, which is covered by the locking ring in the first axial position. Furthermore, geometric structures can be provided to indicate a displacement of the locking ring, e.g. two ribs that are aligned after movement.

In a further preferred variant of the aforementioned embodiment, the locking ring has at least one locking means for locking with a corresponding locking means on the base body. This allows the locking ring to be locked and thus fixed to the base body by means of the locking means.

This enables the previously described irreversibility of the displacement of the locking ring from the first axial position to the second axial position. The locking means of the locking ring are preferably designed in such a way that a displacement from the first axial position of the locking ring to the second axial position is not hindered. As soon as the second axial position is reached, the locking means of the locking ring are automatically activated and the locking ring and the base body are locked.

The locking means can be, for example, snap means on the locking ring, which snap into corresponding snap elements of the base body or the retaining elements in the second axial position of the locking ring and are non-releasable.

In a further embodiment, the base body has a stop for the locking ring on the side of the thread facing away from the tube insertion, wherein the opposing end faces of the stop and of the locking ring are wave-shaped and the wave shape of the end faces corresponds to the pitch of the thread.

Due to the matching wave form of the end faces of the stop and the locking ring and the pitch of the thread, when the locking ring is turned, an equal-action force is transmitted through the wave form of the end faces in addition to the force transmission via the thread. In other words, the thread is additionally relieved by the wave form of the end faces. This can provide better functionality and stability, particularly in the case of very steep thread turns, such as those required to move the locking ring from the first axial position to the second axial position with a rotation of less than 900.

In a further embodiment, in the first axial position, the wave troughs of the end face of the stop are opposite the wave crests of the end face of the ratchet ring, and in the second axial position, the wave troughs of the end face of the stop are opposite the wave troughs of the end face of the ratchet ring.

This allows a visual indication of the status of the displacement of the locking ring and thus of the locking status of the pipe connection. For example, a green area of the base body may be visible in the second axial position of the locking ring, which is hidden by the locking ring in the first axial position, since in the first axial position the wave troughs of the face of the stop are opposite the wave crests of the face of the locking ring and thus flush with each other. In this example, the visibility of the green area or an area with a geometric structure would signal that the locking ring is in the second axial position and that the pipe connection is thus locked.

Furthermore, the matching waveform of the end faces of the stop and the locking ring and the positions of the wave troughs and wave crests in the corresponding axial positions of the locking ring ensure that the fitting remains in the as-delivered state, i.e. locking ring in first axial position, until the locking ring is deliberately moved to the second axial position. In other words, the matching waveform prevents unintentional displacement of the locking ring from the first axial position to the second axial position, for example during transport, which would render the fitting unusable in the case of an irreversible embodiment described above.

BRIEF DESCRIPTION OF THE DRAWINGS

In the following, the invention is explained by means of embodiment examples with reference to the drawing. The drawing shows FIG. 1a-b two representations of a fitting according to the invention with a pipe to be connected to illustrate the locking ring position, FIG. 2 the basic body of the fitting shown in FIG. 1 in perspective view, FIG. 3 the locking ring of the fitting shown in FIG. 1 in perspective view, FIG. 4 the fitting according to FIG. 1 in cross-section along line IV-IV in FIG. 1a without tube, FIG. 5a-c three representations of the fitting according to FIG. 1 with a pipe to be connected in cross-section along the line V-V in FIG. 1a FIG. 6a-b two representations of a fitting according to the invention with a pipe to be connected in side view FIG. 7a-b two representations of the fitting according to FIG. 6a-b in cross-section along the line VIIA-VIIA in FIG. 6a and VIIB-VIIB in FIG. 6b respectively

DESCRIPTION OF THE INVENTION

Figure 1A:
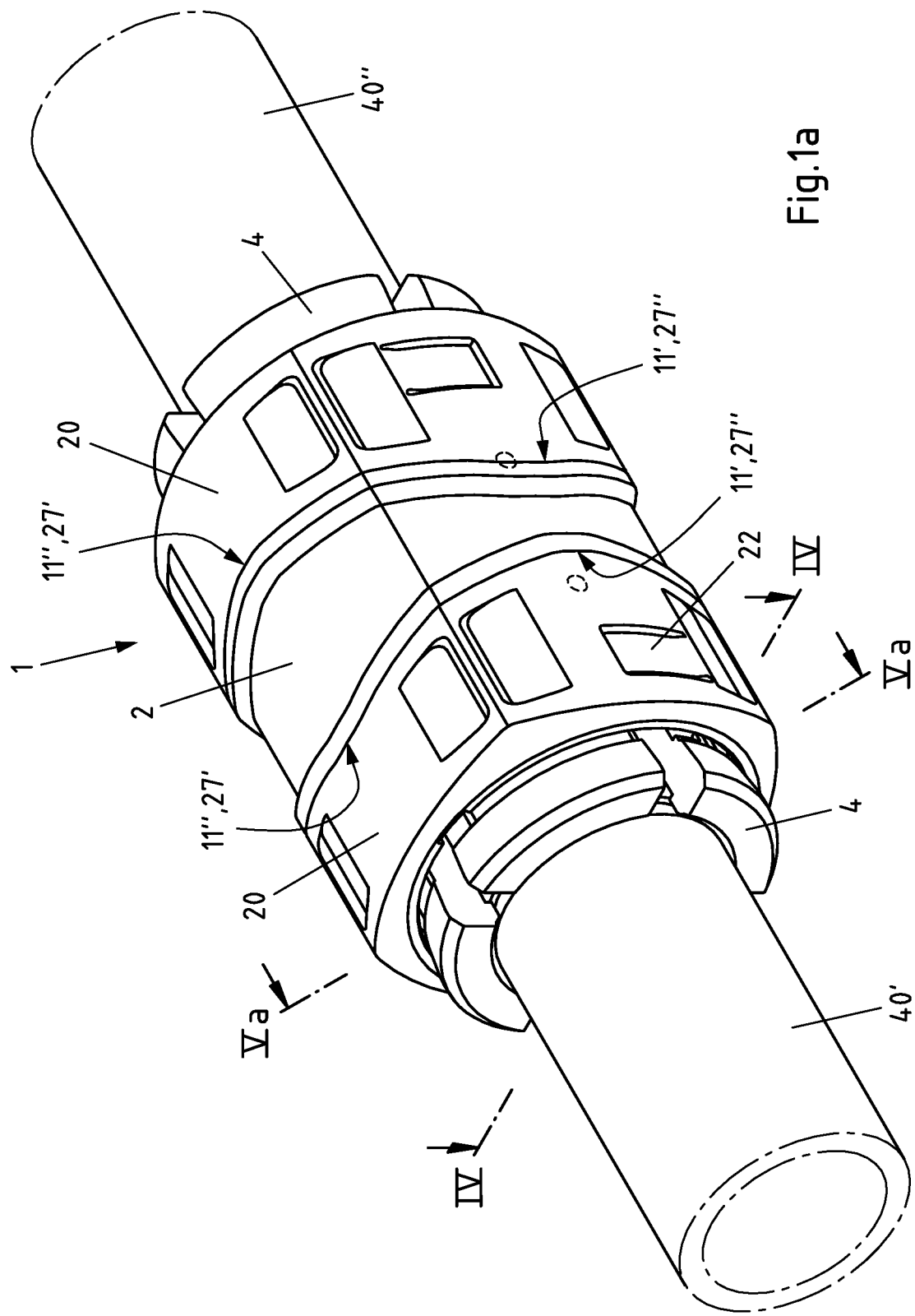
Figure 1B:
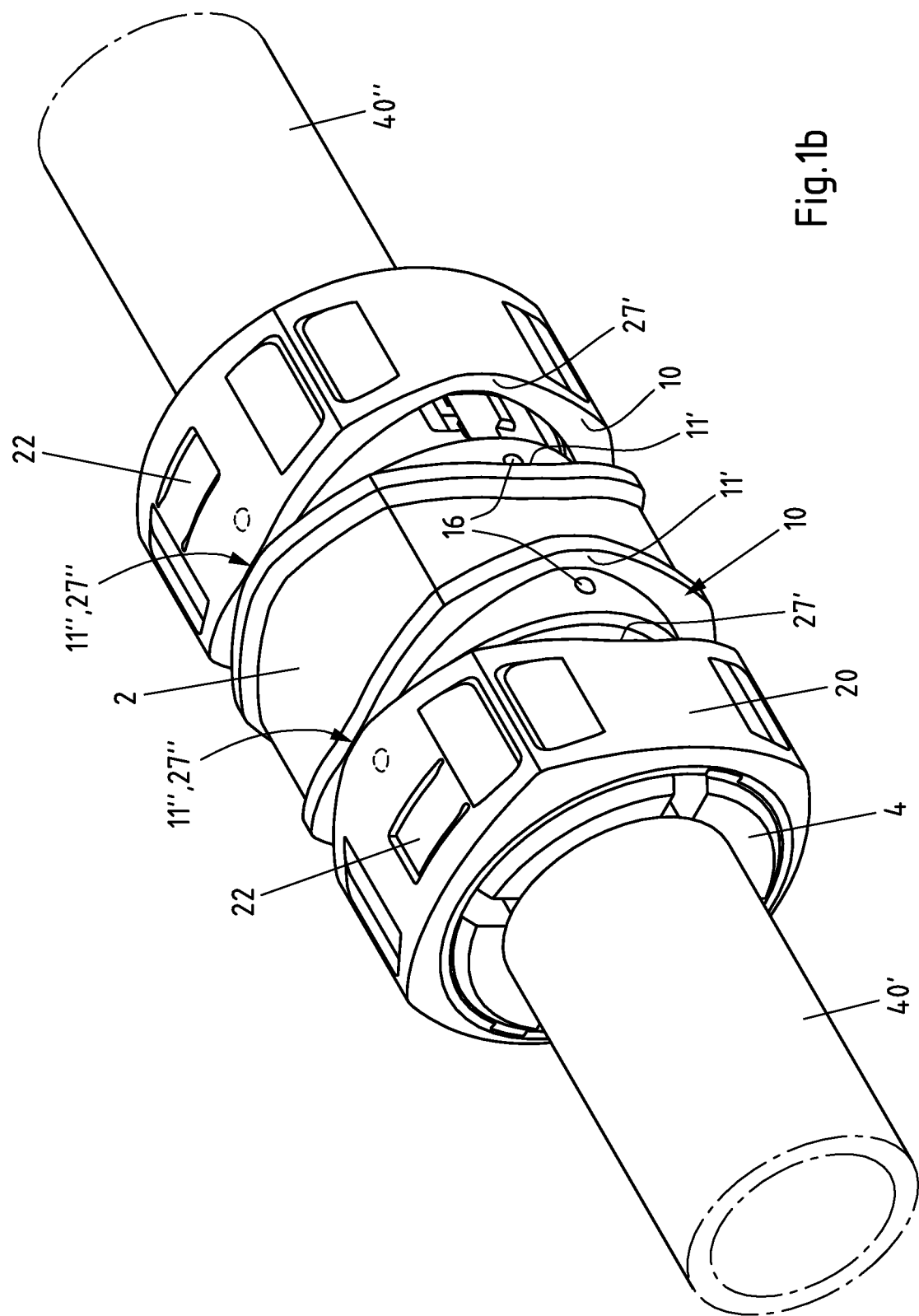

FIG. 1a-b each show a perspective view of a fitting 1 according to the invention for non-detachable connection to at least one pipe 40', 40", wherein the fitting 1 has a base body 2, a retaining element 4, which has latching element 6 for latching with a corresponding latching element 42 of the pipe 40', 40" to be connected, a sealing element 8 and a locking ring 20, wherein the locking ring 20 is connected to the basic body 2 via a thread 24, the locking ring 20 in a first axial position permits a movement of the retaining element 4 in the radial direction and the locking ring 20 in a second axial position prevents a movement of the retaining element 4 in the radial direction outwards.

In this embodiment, the tube 40', 40" has a groove as a corresponding latching element 42 for latching with the latching element 6 of the retaining element 4. Furthermore, in FIG. 1a-b, locking means 22 of the locking ring 20 for locking with a corresponding locking means 12 on the base body 2 are visible (explicitly shown in FIG. 7a-b).

The base body 2 has a stop 10 for the locking ring 20 on the side of the thread 24 facing away from the tube insertion, wherein the opposing end faces 11', 11", 27', 27" of the stop 10 and of the locking ring 20 are of wave-shaped design and the wave shape of the end faces 11', 11", 27', 27" corresponds to the pitch of the thread 24.

FIG. 1a shows the fitting 1 with the locking ring 20 positioned in the first axial position. In this position, the insertion of a pipe 40', 40" takes place, whereby the latching element 6 of the retaining element 4 are pressed outwards in the radial direction. The end faces 11', 11", 27', 27" of the stop 10 and of the locking ring 20 are arranged in such a way that in each case a wave crest 27" of the locking ring 20 is opposite a wave trough 11' of the stop 10 and a wave trough 27' of the locking ring 20 is opposite a wave crest 11" of the stop 10.

FIG. 1b shows the fitting 1 after the latching element 6 of the retaining element 4 have locked with the corresponding latching element 42 of the tube 40', 40". During this locking, it can be provided that the latching elements 6 of the retaining element 4 cause an acoustic signal, which indicates the completed locking of the latching elements 6 of the retaining element 4 with the corresponding latching element 42 of the tube 40', 40".

Furthermore, in FIG. 1b the locking ring 20 has been shifted from the first axial position to the second axial position along the thread 24 by turning it through an angle of 90°. Movement of the latching element 6 of the retaining element 4 in a radially outward direction is prevented in this position by the locking ring 20. The end faces 11', 11", 27', 27" of the stop 10 and of the locking ring 20 are arranged in such a way that in each case a wave crest 27" of the locking ring 20 faces a wave crest 11" of the stop 10 and a wave trough 27' of the locking ring 20 faces a wave trough 11' of the stop 10. Between the respective wave troughs 11', 27' of the stop 10 and of the locking ring 20, a surface of the base body 2 becomes visible, which can have a coloured marking as an indicator of the status of the displacement of the locking ring 20.

Figure 2:
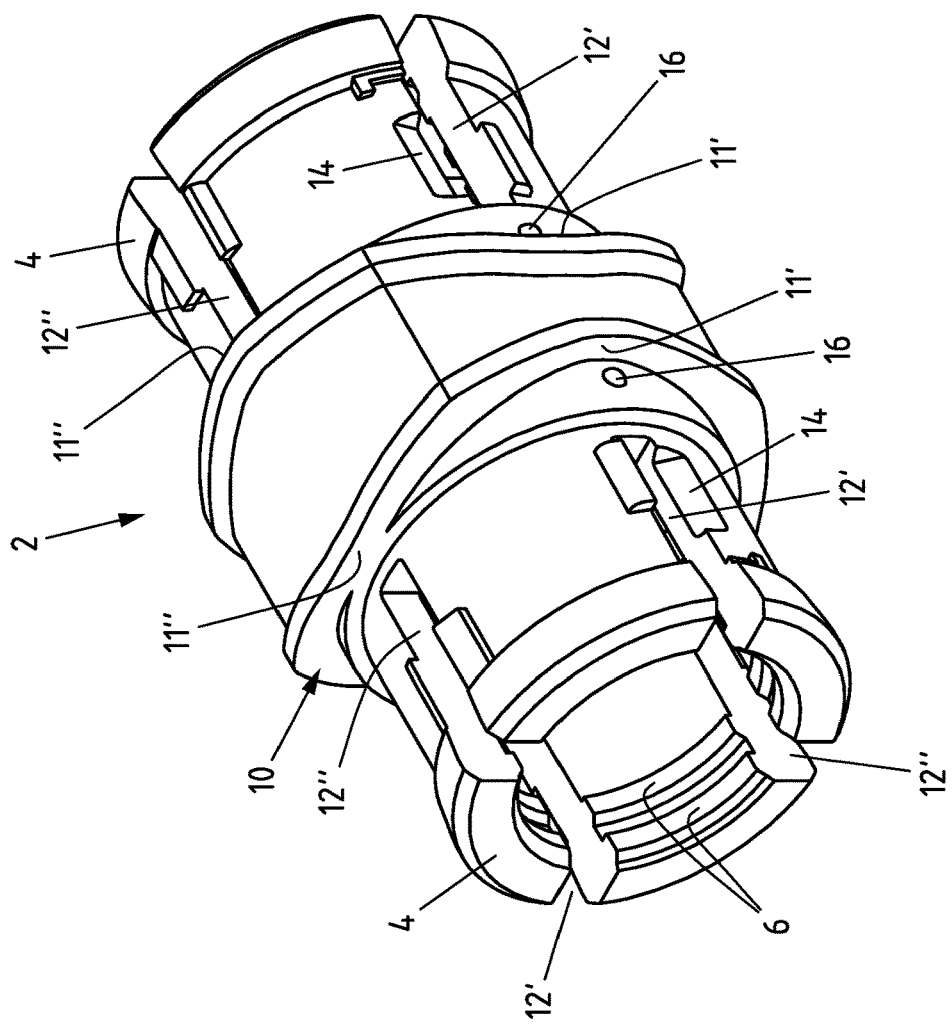

FIG. 2 shows a perspective view of the base body 2. In this view, the locking means 12' on the base body 2 for locking with the locking means 22 of the locking ring 20 is visible. The corresponding locking means 12" on the base body 2 are rectangular recesses 12', 12" into which the locking means 22 of the locking ring 20 engage in the second axial position of the locking ring 20.

Furthermore, the stop 10 of the base body 2 for the locking ring 20 is shown including the already described wave troughs 11' and wave crests 11" of the front sides of the stop 10.

Figure 3:
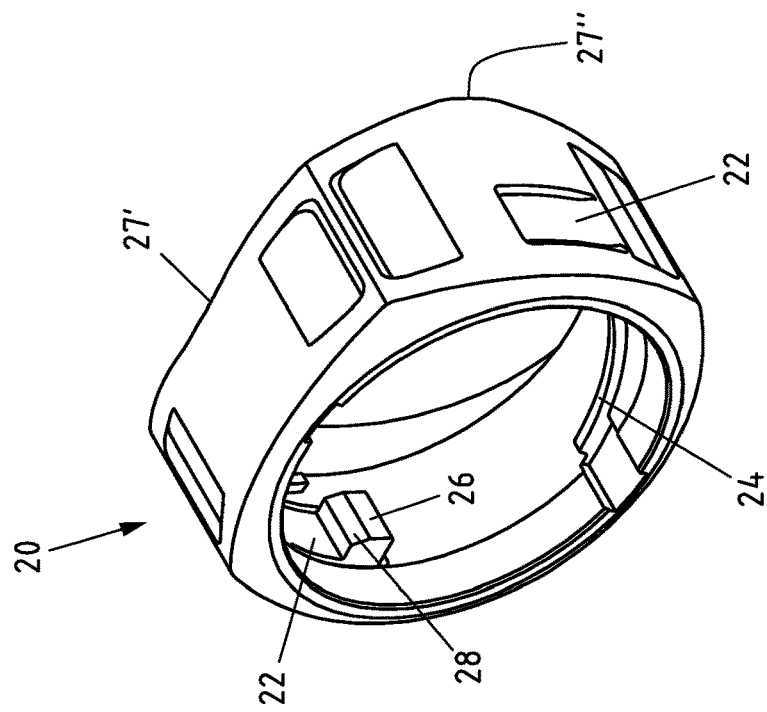

FIG. 3 shows a perspective view of the locking ring 20. The thread 24, via which the locking ring 20 is connected to the main body 2, can be seen. In addition, the locking means 22 of the locking ring 20 is visible. The locking means 22 of the locking ring 20 is formed by two locking lugs 26 with a bevel 28, which engage with the corresponding locking means 12 on the base body 2 in the second axial position of the locking ring 20.

FIG. 3 also shows the wave troughs 27' and wave crests 27" of the end faces of the locking ring 20 described above.

Figure 4:
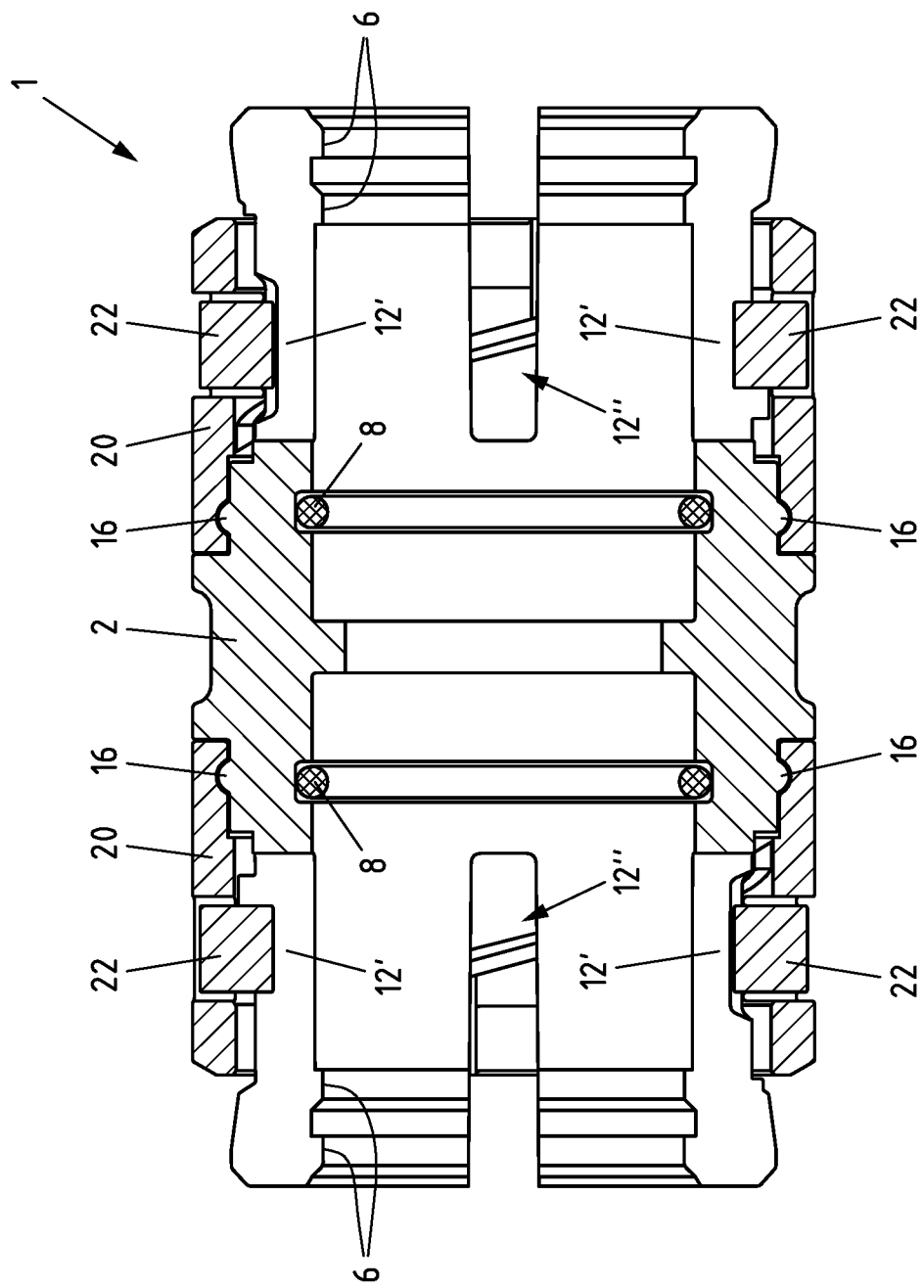

FIG. 4 shows the fitting 1 from FIG. 1 in cross-section along the line IV-IV in FIG. 1a without tube 40', 40". The angular shape of the latching element 6 of the retaining element 4 is shown, which enables a stable connection when latching with the corresponding latching element 42 of the tube 40', 40".

In addition to the features already described, the sealant 8 embedded in a groove of the base body 2 is shown. In this example, the sealant 8 corresponds to an O-ring.

Furthermore, a hemispherical protrusion 16 of the base body 2 is provided, which engages in a corresponding recess in the locking ring 20 in the first axial position of the locking ring 20. This engagement of the hemispherical protrusion 16 supports that the fitting 1 remains in the delivery condition, i.e. locking ring 20 in the first axial position, until the locking ring 20 is deliberately moved into the second axial position. In other words, the engagement of the hemispherical protrusion 16 supports an unintentional displacement of the locking ring 20 from the first axial position to the second axial position, for example during transport, which would render the fitting 1 unusable.

Figure 5A:
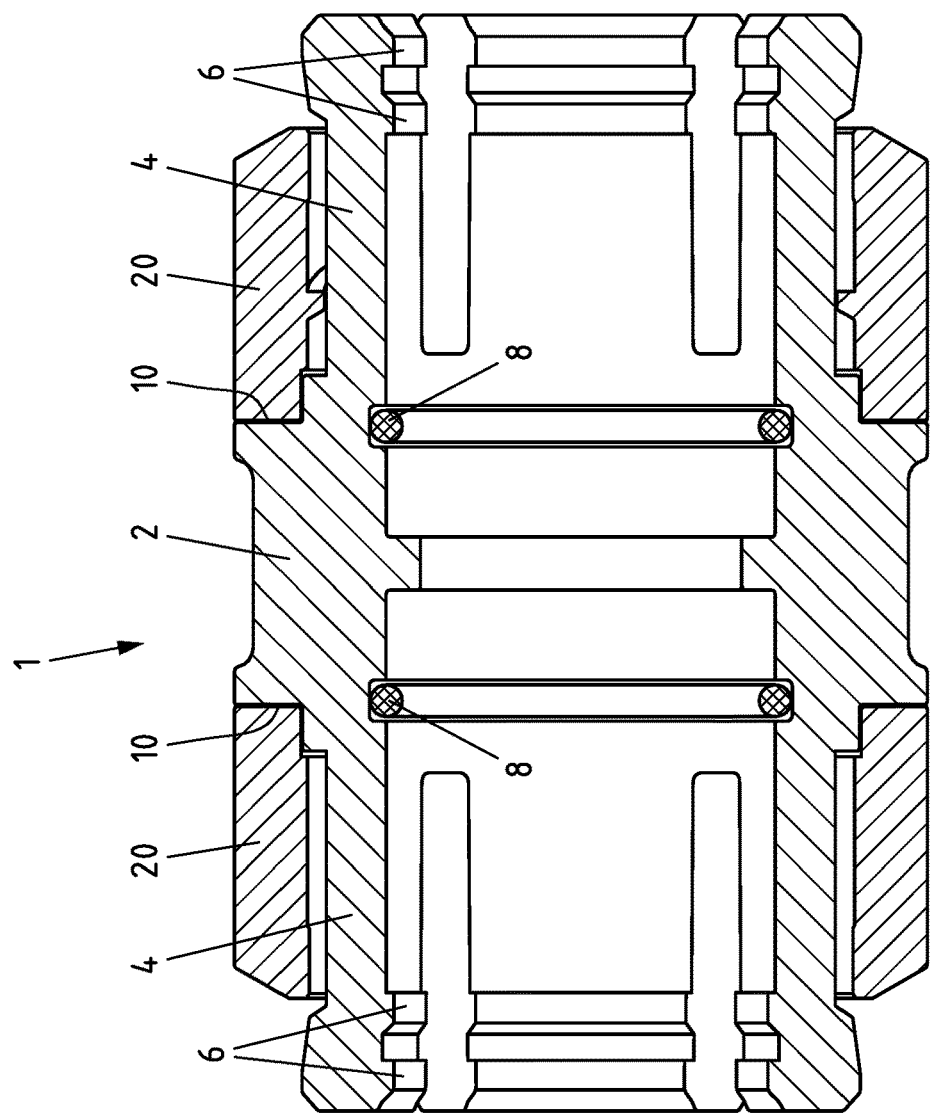
Figure 5A:
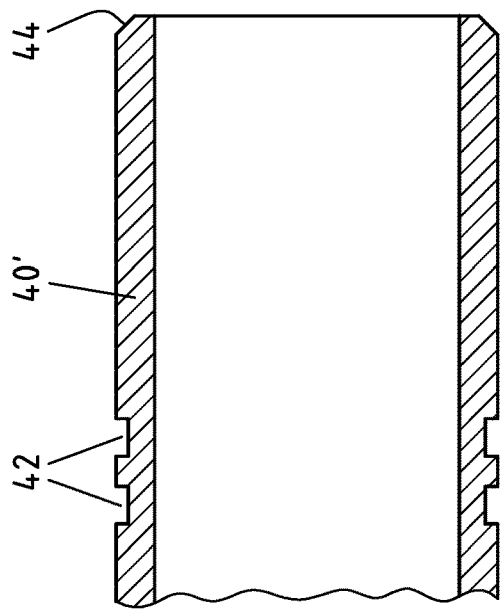
Figure 5B:
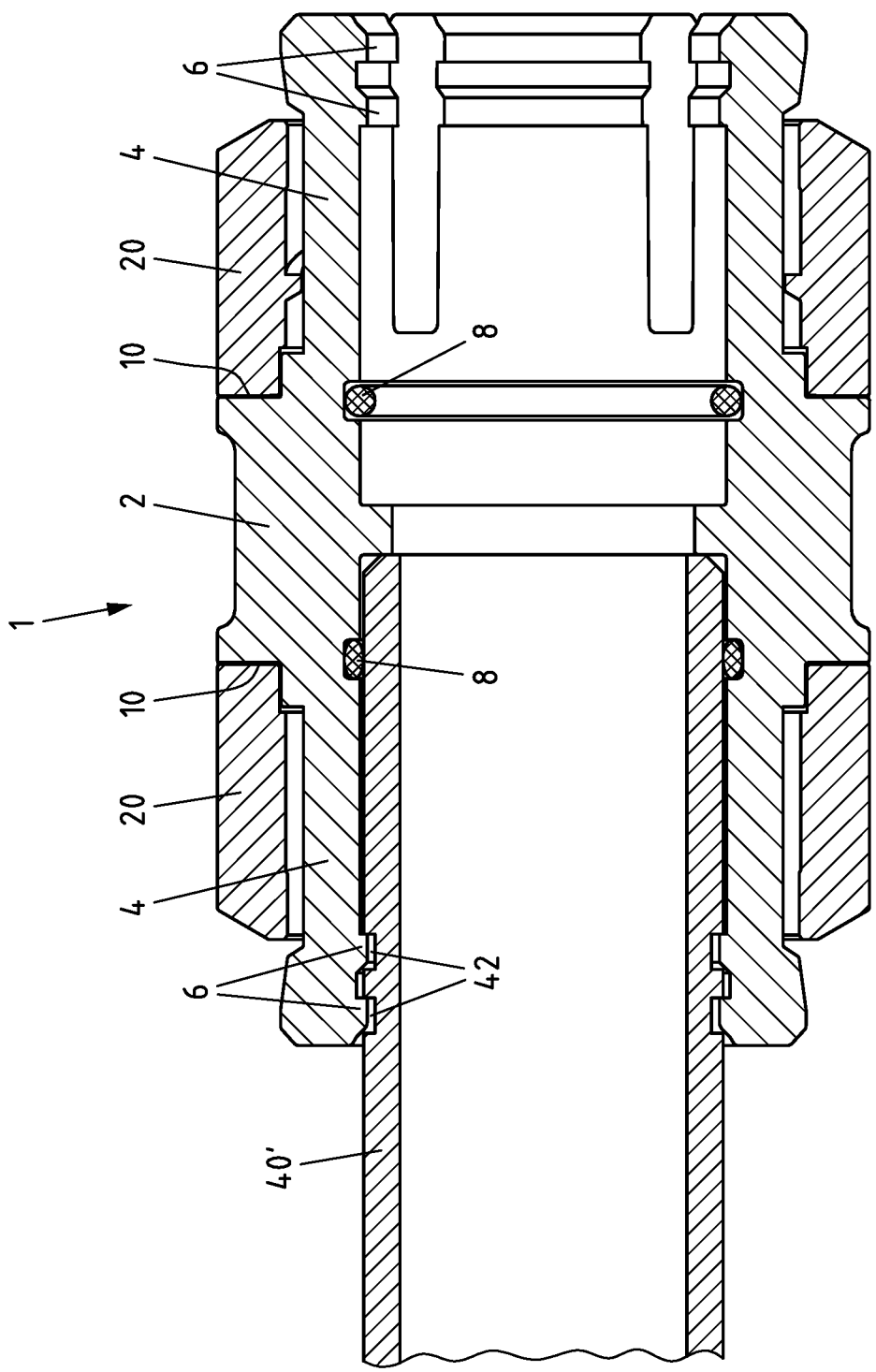
Figure 5C:
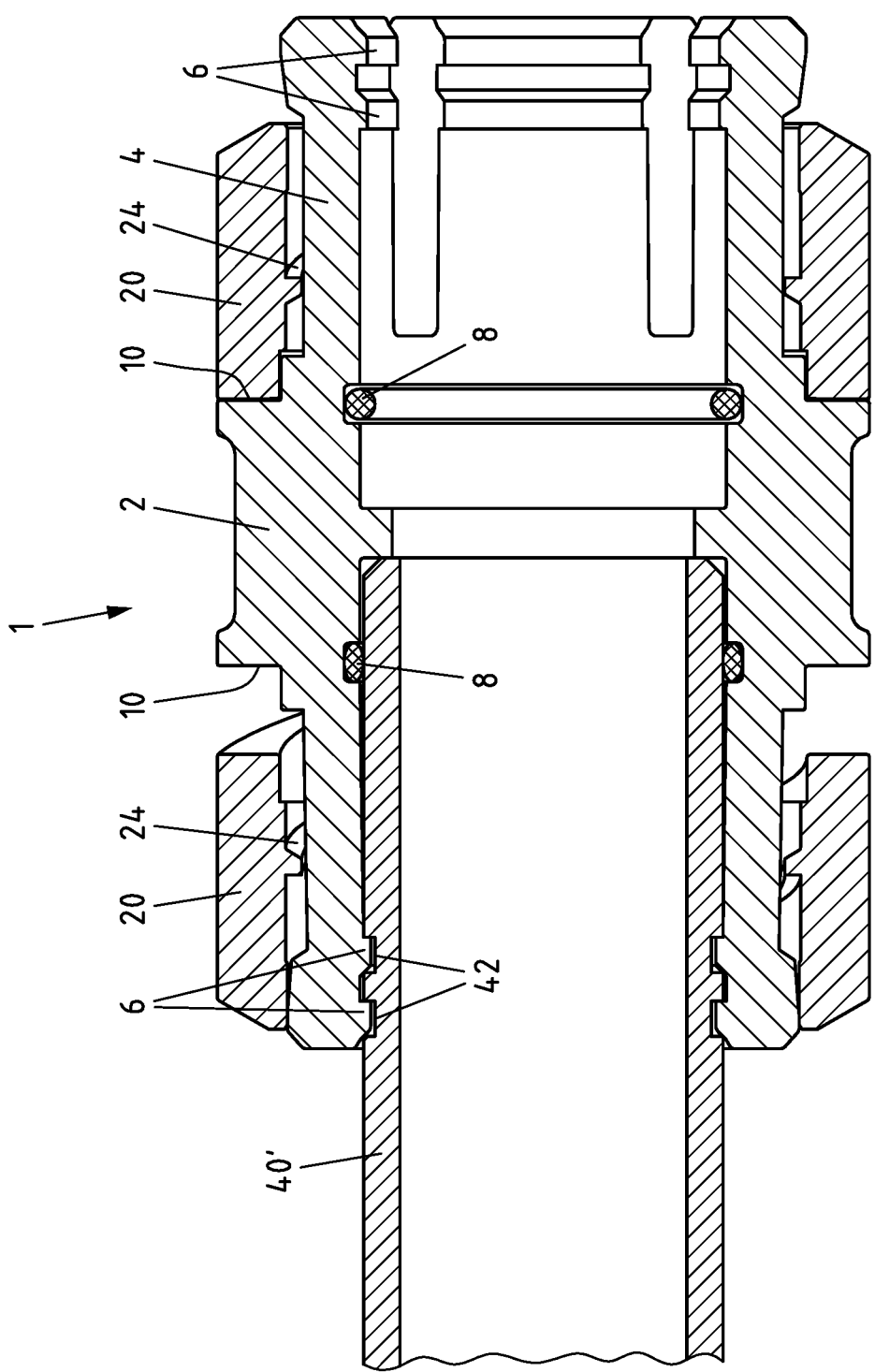

FIG. 5*a-c* show three representations of the fitting according to FIG. 1 with a pipe 40' to be connected in cross-section along the line V-V in FIG. 1 *a*. From FIG. 5*a* via FIG. 5*b* to FIG. 5*c* it is shown how the process of non-detachably connecting the fitting 1 to at least one pipe 40' takes place.

FIG. 5*a* shows how a pipe 40' provided with two grooves as corresponding latching elements 42 of the pipe 40' is positioned in relation to the fitting 1. The end face of the tube 40' facing the fitting 1 has a chamfer 44 so that the sealing element 8 of the fitting 2 in the form of an O-ring is not damaged when the tube 40' is pushed into the fitting 2. The locking ring 20 is in the first axial position, which allows radial movement of the latching element 6. The latching element 6 of the retaining element 4 are pressed radially outwards when the pipe 40' is inserted.

FIG. 5*b* shows the pipe 40' inserted into the fitting 1. The latching element 6 of the retaining element 4 are engaged in the corresponding latching element 42 of the pipe 40'. The sealing element 8 is oval-shaped and seals with the outer wall of the inserted pipe 40'. The pipe connection is already tight in this state and, due to the engagement of the latching element 6 of the retaining element 4 and the corresponding latching element 42 of the pipe 40', is connected and can no longer be released.

FIG. 5*c* shows the fitting 1 and the inserted pipe 40' after the connection of fitting 1 and pipe 40' has been fully completed. The locking ring 20 has been moved to the second axial position by twisting it along the thread 24. By shifting the locking ring 20 into the second axial position, a renewed radially outward movement of the latching element 6 of the retaining element 4 is prevented. The latching element 6 of the retaining element 4, which are latched with the corresponding latching element 42 of the pipe 40', can be disengaged, for example, by movements of the piping system, high internal pipe pressure or other influences if the locking ring 20 has not been closed.

Figure 6A:
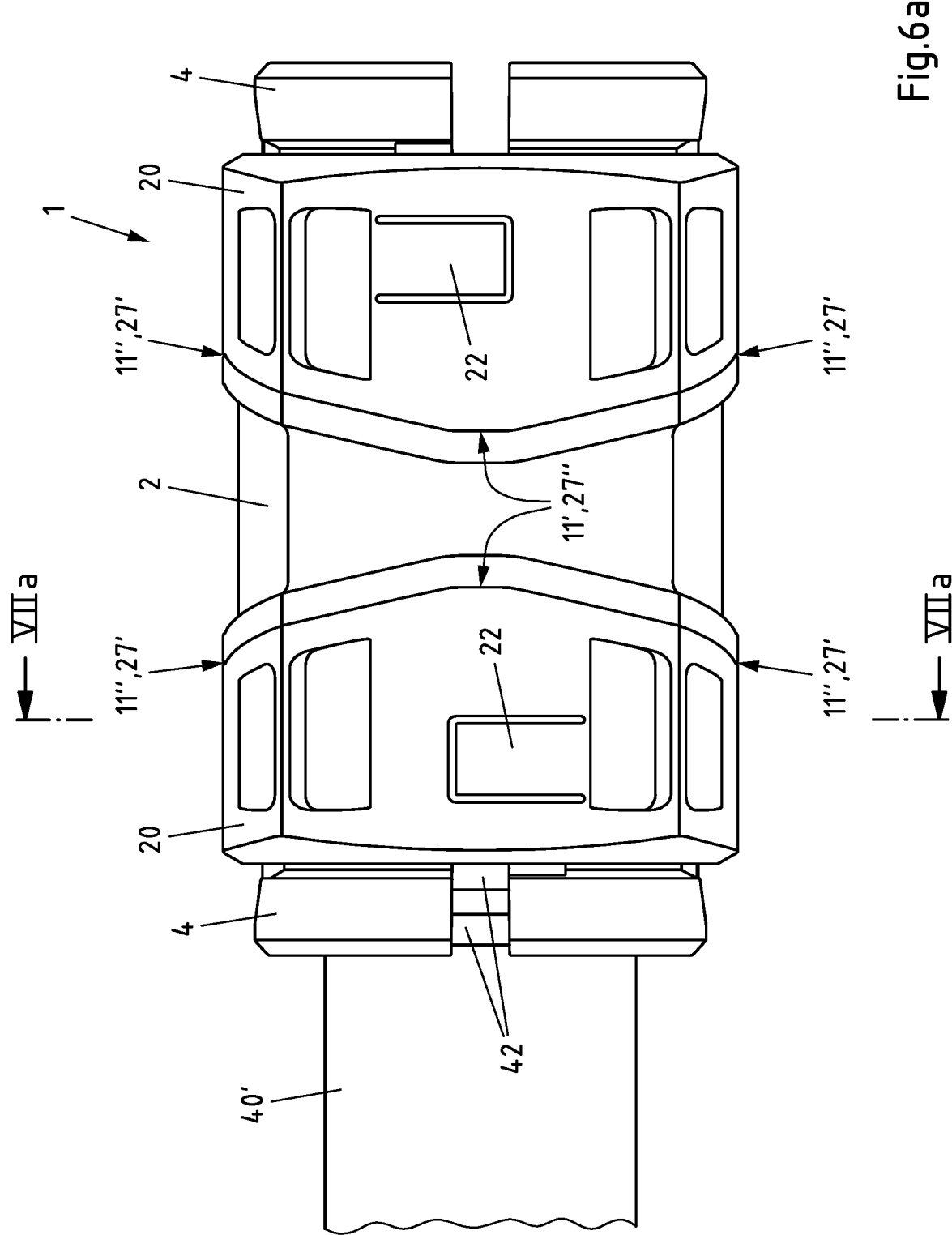
Figure 6B:
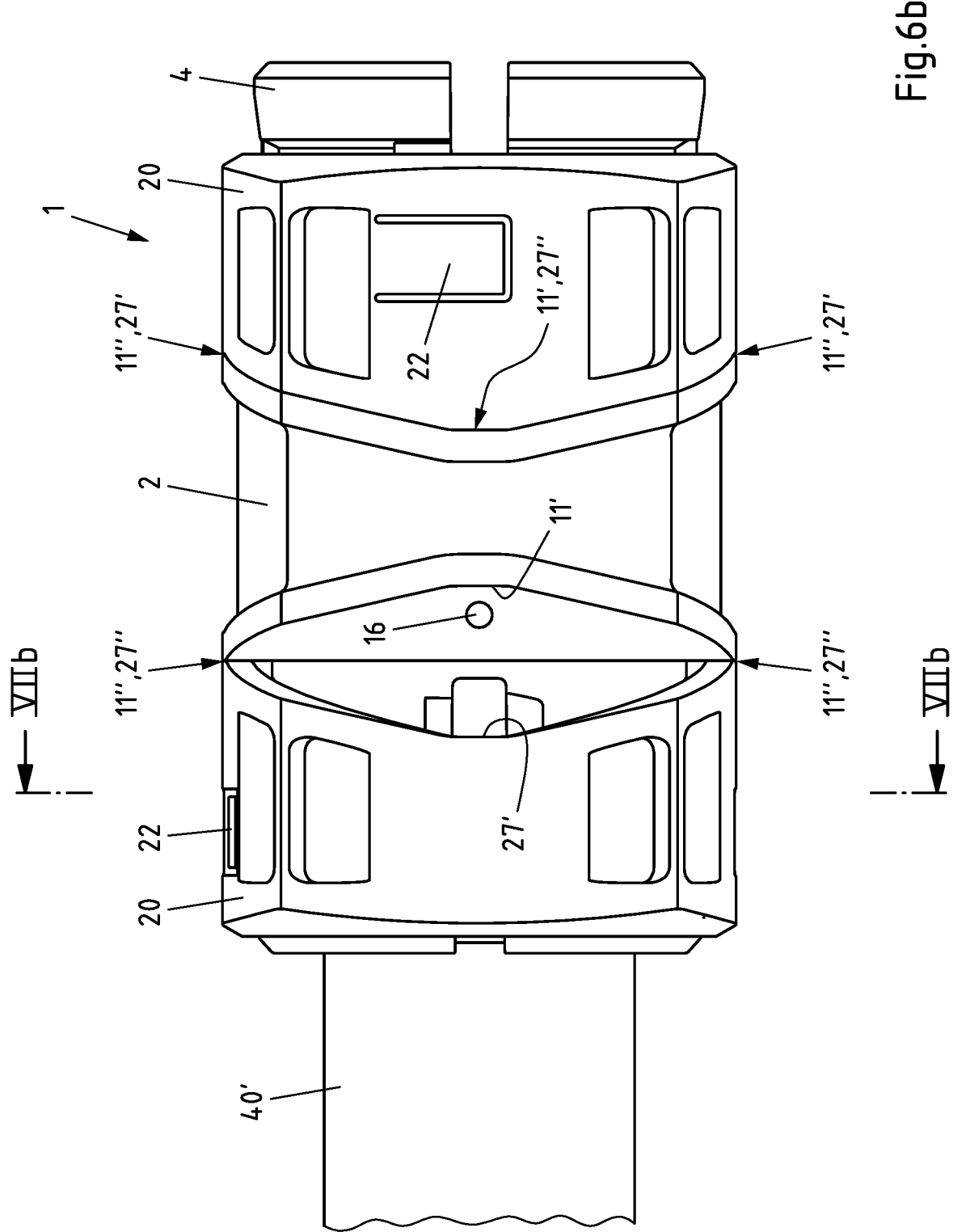

FIG. 6*a-b* show two representations of a fitting 1 according to the invention with a pipe 40' to be connected in a side view. In particular, the function and effect of the end faces 11', 11", 27', 27" of the stop 10 and the locking ring 20 described in FIG. 1*a-b* are clarified. FIG. 6*a* shows the side view of the situation known from FIG. 1 *a*, while FIG. 6*b* shows the same for FIG. 1 *b*.

FIGS. 7*a-b* show two representations of the fitting according to FIGS. 6*a-b* in cross-section along the line VIIA-VIIA in FIG. 6*a* and VIIB-VIIB in FIG. 6*b*, respectively. This embodiment describes the irreversibility of the axial displacement of the locking ring 20 from the first axial position to the second axial position due to a locking means 22 of the locking ring 20 for locking with a corresponding locking means 12 on the base body 2. This is a so-called "twist & lock" mechanism.

FIG. 7*a* shows the fitting 1 in cross-section, with the locking ring 20 in the first axial position. In this example, the locking means 22 of the locking ring 20 are in the form of locking lugs 26, and the corresponding locking means 12 on the base body 2 are in the form of recesses 12', 12". The locking lugs 26 of the locking means 22 have a slope 28, which slide out of the recesses 12' over a corresponding slope 14 of the recess 12' when the locking ring 20 is turned counter clockwise. It is thus possible to move the locking ring 20 from the first axial position to the second axial position by turning the locking ring 20 along the thread 24.

FIG. 7*b* shows the fitting 1 in cross-section with the locking ring 20 in the second axial position. The locking means 22 in the form of locking lugs 26 are snapped into the corresponding locking means 12 in the form of recesses 12". Rotation into the original first axial position of the locking ring 20 in the clockwise direction is not possible, as corresponding bevels 14, 28 are missing on recess 12', 12" and locking lugs 26. Further counter clockwise rotation is also not possible as the recess 12" does not have a slope 14. The locking ring 20 is thus irreversibly locked in the second axial position and prevents a renewed radially outward movement of the latching element 6 of the retaining element 4 as described above.

The invention claimed is:

1. A fitting for connection to at least one pipe, with a base body, with a retaining element, the retaining element having latching elements for latching with a corresponding latching element of the pipe to be connected, and with a sealing element within the base body, wherein the fitting has a locking ring, wherein the locking ring in a first axial position allows a movement of the retaining element in radial direction and wherein the locking ring in a second axial position prevents a movement of the retaining element in the outwards radial direction, characterised in that the axial displacement of the locking ring from the first axial position to the second axial position is irreversible, wherein the irreversibility is achieved by a locking means which acts in the second axial position of the locking ring between the locking ring and the base body, and wherein the locking ring can only be released by a destruction of the locking element.

2. The fitting according to claim 1, wherein the locking ring is connected to the body via a thread.

3. The fitting according to claim 2, wherein the axial displacement of the locking ring from the first axial position to the second axial position is effected by twisting the locking ring along the thread, the twisting being effected through an angle of less than 360°, preferably less than 90°.

4. The fitting according to claim 1, wherein the retaining element and the base body are integrally formed.

5. The fitting according to claim 1, wherein the locking ring comprises at least one locking means for locking with a corresponding locking means on the base body.

6. The fitting according to claim 5, wherein the locking means generates an acoustic signal when locking with the corresponding locking means on the base body.

7. The fitting according to claim 1, wherein the base body has a stop for the locking ring on the side of the thread facing away from the tube insertion, the opposite end faces of the stop and of the locking ring are of undulating design, and the waveform of the end faces corresponds to the pitch of the thread.

8. The fitting according to claim 7, wherein the first axial position, the wave troughs of the end face of the stop are opposite the wave crests of the end face of the locking ring, and the second axial position, the troughs of the end face of the stop are opposite the troughs of the end face of the locking ring.

\* \* \* \* \*